US008054929B2

(12) United States Patent
Giorgetta et al.

(10) Patent No.: US 8,054,929 B2
(45) Date of Patent: Nov. 8, 2011

(54) SYSTEM AND METHOD FOR AUTO-SQUELCHING DIGITAL COMMUNICATIONS

(75) Inventors: Timothy Eric Giorgetta, San Diego, CA (US); Madjid A. Hamidi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1532 days.

(21) Appl. No.: 11/477,992

(22) Filed: Jun. 29, 2006

(65) Prior Publication Data

US 2008/0002793 A1 Jan. 3, 2008

(51) Int. Cl.
*H04L 7/00* (2006.01)
(52) U.S. Cl. ...................................... 375/357
(58) Field of Classification Search .................. 375/357, 375/358; 455/212, 218–225
See application file for complete search history.

(56) References Cited

U.S. PATENT DOCUMENTS 7,805,294 B2 * 9/2010 Taniguchi ..................... 704/205

FOREIGN PATENT DOCUMENTS

WO WO2006/033428 * 3/2006

* cited by examiner

*Primary Examiner* — Kevin Kim
(74) *Attorney, Agent, or Firm* — Law Office of Gerald Maliszewski; Gerald Maliszewski

(57) ABSTRACT

A system and method are provided for auto-squelching digital communications. The method receives digital information from a source node. If the receive channel is corrupted, an alarm condition is detected that is associated with the received digital information. The method transmits an alarm-condition signal to a destination node, and in response to transmitting the alarm-condition signal, maintains a valid link to the destination node. For example, detecting the alarm condition may include: comparing a frequency associated with the recovered clock signal, with a reference frequency; and, detecting a variance between the recovered clock signal frequency and the reference frequency. Alternately, loss of signal, loss of lock, out of band, and run length alarm conditions may be detected. The alarm-condition signal that is transmitted may be a serial data stream of information such as all "0"s data, all "1"s data, or alternating "0"s and "1"s data for example.

23 Claims, 3 Drawing Sheets

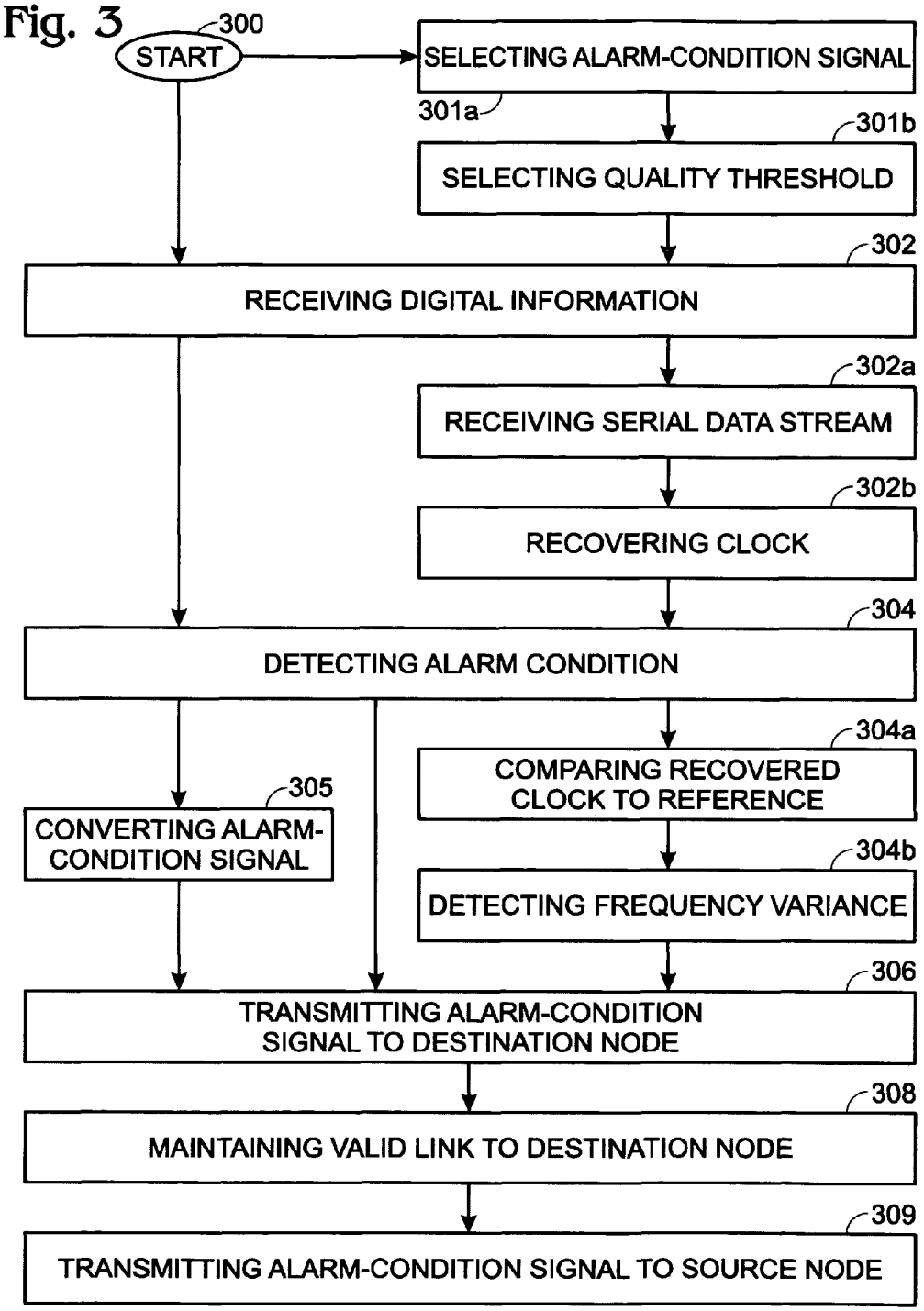

SYSTEM AND METHOD FOR AUTO-SQUELCHING DIGITAL COMMUNICATIONS

BACKGROUND OF THE INVENTION

1. Field of the Invention

This invention generally relates to digital communications and, more particularly, to a system and method for maintaining a valid communication link with a destination node, by automatically sending an alarm-condition signal in the event that a receive channel is corrupted.

2. Description of the Related Art

In conventional analog communications, a receiver's gain is set to a maximum level in the event that an incoming signal cannot be detected. Some receivers have an adjustable squelch that determines the maximum gain level. In the case of a two-way radio, the familiar static/hiss sound heard by a user is associated with a receiver with an open squelch (maximum gain). The static/hiss sound is an indicator to the user that no signal is being received, or the receive signal is below the noise floor.

Conventional digital systems do not operate using the concept of squelch. In one simple case, received data is decoded or demodulated, and presented, regardless of the bit error rate (BER). If the data is to be retransmitted, the retransmitted signal is likewise full of errors. Other systems retransmit the received signal in a traffic channel, along with an error signal (e.g., BER) in an overhead channel. Other systems may shut down the traffic channel if there are too may received errors. Digital communications systems do not conventionally maintain a valid data link once the data to be transmitted becomes corrupted.

It would be advantageous if a digital communication system could transmit the digital equivalent of a squelch signal, in the event that received channel information is corrupted, to ensure that the two link ends maintain a common clock domain.

It would be advantageous if a digital communication system could send an alarm signal in a transmit traffic channel, to act as a digital equivalent to a squelch, which notifies communicate link nodes of transmission problems.

SUMMARY OF THE INVENTION

Accordingly, a method is provided for a communications device to auto-squelch digital communications. The method receives digital information from a source node. If the receive channel is corrupted, an alarm condition is detected that is associated with the received digital information. The method transmits an alarm-condition signal to a destination node, and in response to transmitting the alarm-condition condition signal, maintains a valid link to the destination node.

In one aspect, a serial stream of digital information is received, and the method recovers a clock signal from the serial data stream. Then, detecting the alarm condition includes: comparing a frequency associated with the recovered clock signal, with a reference frequency; and, detecting a variance between the recovered clock signal frequency and the reference frequency. Alternately, loss of signal, loss of lock, out of band, and run length alarm conditions may be detected. The alarm-condition signal that is transmitted may be encoded as a serial data stream of information such as all "0"s data, all "1"s data, alternating "0"s and "1"s data, a predetermined pattern of "0"s data and "1"s data, or a pseudorandom pattern of "0"s and "1"s data.

In another aspect, the alarm condition signal may be selectable. Further, a received digital information quality threshold may be selected, so that the detection of the alarm condition includes the comparison of received digital information to the selected quality threshold. In one aspect, a plurality of quality thresholds can be selected and a unique alarm-condition signal can be automatically transmitted for each quality threshold.

Additional details of the above-described method and a communication device with a system for auto-squelching digital communications are provided below.

BRIEF DESCRIPTION OF THE DRAWINGS

FIG. 3 is a flowchart depicting a method for auto-squelching digital communications in a communications device.

DETAILED DESCRIPTION

Figure 1:
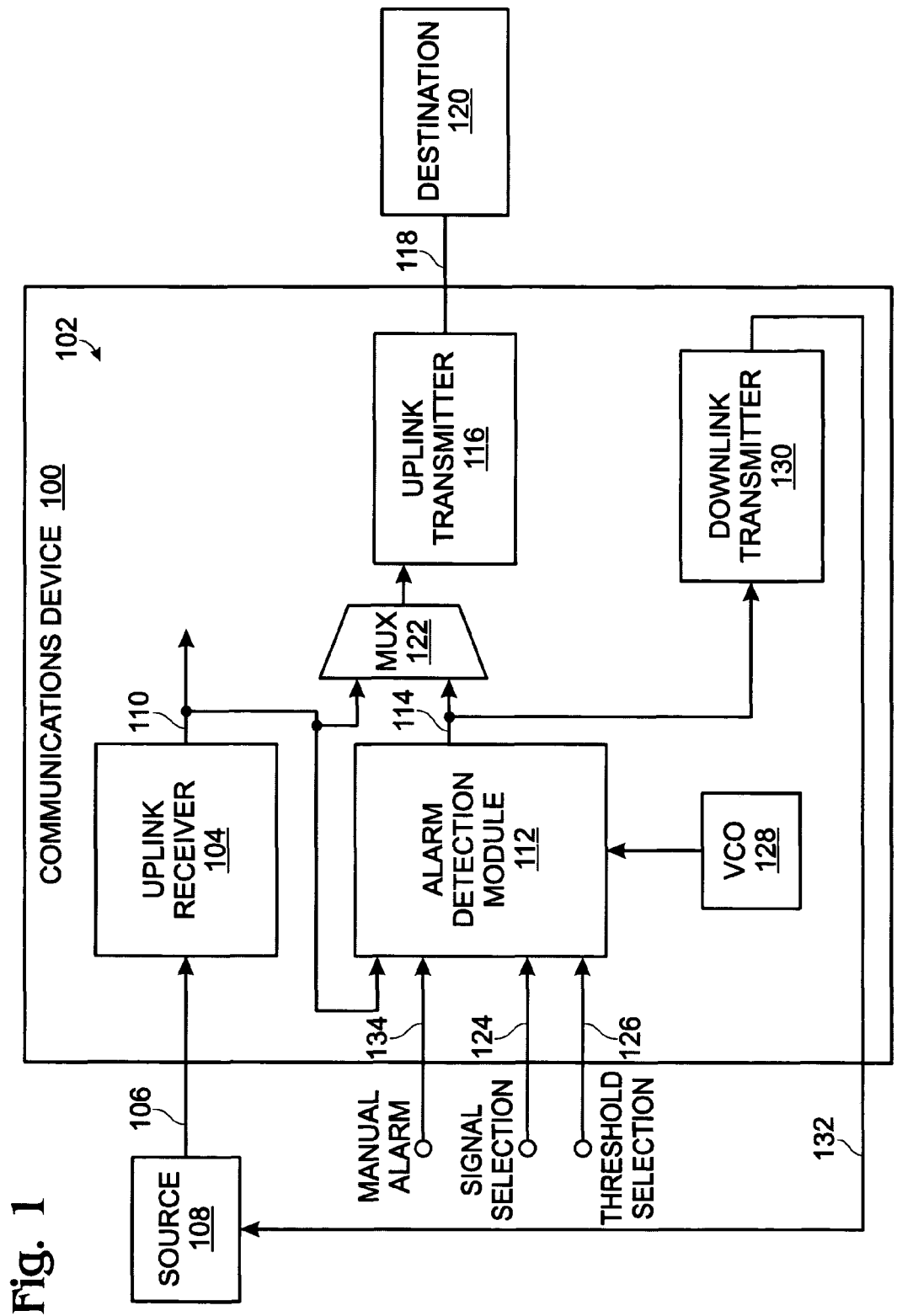
FIG. 1 is a schematic block diagram of a communications device, with a system for auto-squelching digital communications.

FIG. 1 is a schematic block diagram of a communications device 100, with a system 102 for auto-squelching digital communications. The system 102 comprises an uplink receiver 104 having an interface on line 106 for receiving digital information from a downlink source 108. The receiver 104 has an interface on line 110 for supplying the digital information.

An alarm detection module 112 has an interface on line 110 for receiving the digital information. In the event of corrupted data for example, the alarm detection module 112 detects an alarm condition associated with the digital information, and supplies an alarm-condition signal at an interface on line 114. An uplink transmitter 116 has an interface on line 114 for accepting the alarm-condition signal and an interface on line 118 that maintains a valid link to an uplink destination 120 in response to transmitting the alarm-condition signal. Alternately stated, if the receiver 104 fails to recover the received digital information, the uplink transmitter 116 maintains a valid link to the destination node, regardless of whether the receiver 104 recovers the received digital information. The transmission of the alarm-condition signal permits the communication device 100 and the uplink destination 120 to remain locked to the same clock. If the communication device 100 starts to receive and transmit valid data, the uplink destination 120 is able to acquire and extract the valid data more quickly by having maintained a common clock domain with communication device 100.

In one variation, a user interface on line 134 may be used to manually send an alarm-condition signal, regardless of the quality of the received information.

In some aspects, the digital information received on line 106 is decoded and/or demodulated. In other aspects, the information is simply relayed (as shown). As shown, a multiplexer (MUX) 122 can be used to send either the received digital information or the alarm-condition signal to the uplink transmitter 116. In a different aspect, such as in a Synchronous Optical Network (SONET) or Synchronous Digital Hierarchy (SDH) communication device, certain channels in the digital information may be decoded, while additional channels are added to the relayed information.

Although the input line 106 and output line 118 are both depicted as serial lines, it should be understood that the system 102 can be enabled with either serial or parallel inputs. Likewise, the alarm-condition signal can be transmitted via either serial or parallel lines. Many communications systems using serial data lines require the receiver 104 to simultaneously recover a clock signal from the serial data stream on line 106. Therefore, in one aspect, the alarm detection module 112 detects an alarm condition in response to comparing a frequency associated with the recovered clock signal, to a reference frequency. The alarm detection module 112 detects a variance between the recovered clock signal frequency and the reference frequency. Other errors commonly associated with serial communications that may be detected by the alarm detection module 112 include loss of signal (LOS), which is associated with the signal amplitude level, as well as loss of lock, out of band, and run length. Some other errors that could potentially be used to trigger an alarm condition include: loss of light, loss of frame, low receiver power, a large BER, signal fail, signal degrade, link failure, receive signal strength, remote error indicator, bit interleaved parity, 8 B/10 B coding errors, and running disparity errors.

An alarm condition can be detected in response to measuring errors in the analog or Physical level communications. As noted above, LOS may trigger an alarm condition. In other aspects, the alarm detection module 112 may respond to errors in decoded digital information, such as BER. If the received information includes forward error correction (FEC) information, the alarm condition may be associated with the total number of corrected bits, the number of corrected "1" bits, the number of corrected "0" bits, or a number of sequential errors.

There are a large variety of potential alarm conditions signals that may be transmitted on line 118. For example, the alarm-condition signal may be transmitted as a serial data stream of information such as all "0"s data, all "1"s data, alternating "0"s and "1"s data, a predetermined pattern of "0"s data and "1"s data, or a pseudorandom pattern of "0"s and "1"s data. These and other patterns of information can likewise be sent as a serial or parallel data stream. Typically, an alarm-condition signal is used that will be recognized by the uplink destination 120. For example, a pattern of alternating "1" and "0" bits may be sent as the alarm-condition signal, with the understanding that uplink destination 120 will recognize the significance of the signal.

In one aspect, the alarm detection module 112 has an interface on line 124 for selecting an alarm-condition signal. For example, the alternating "1"/"0" pattern may be selected by a user, based upon the understanding that the uplink destination will recognize only that alarm-condition signal as significant. Alternately, different alarm-condition signals may be selected for different destinations.

In another aspect, the alarm detection module 112 has an interface on line 126 for selecting a received digital information quality threshold. The alarm detection module 112 detects the alarm condition by comparing the received digital information to the selected quality threshold. For example, such as interface permits a user to select between loss of signal and loss of lock as conditions which trigger an alarm condition signal. Alternately, such an interface permits a user to select the degree of error that will trigger an alarm-condition signal. For example, a user could create a loss of lock trigger when the recovered data differs in frequency from a system VCO 128 by more than 50 parts per million (PPM).

In other aspects, the interface on line 126 can be to select a plurality of quality thresholds. Then, the alarm detection module 112 detects an alarm condition by comparing the received digital information to the plurality of selected quality thresholds. In this manner, the uplink transmitter 116 can transmit a unique alarm-condition signal for each quality threshold. For example, an alarm-condition signal of all "1"s data can be used to signify a loss of lock, while a pattern of alternating "1"s and "0"s data can be used to signify loss of signal.

Some communication formats include traffic channels accompanied by overhead (OH) channels of information. For example, the SONET format bundles the traffic channels in the payload section of a frame, along with OH, such as Transport Overhead (TOH). In one aspect, the alarm-condition signal is sent without regard to the frame message format. However, in a different aspect, the device 100 maintains the conventional OH channels with the uplink destination 120, while using the traffic channels to communicate the alarm-condition signal. Using the SONET format again as an example, in this aspect the uplink transmitter 116 transmits information in a format that includes payload and overhead (OH) bytes, and provides additional validity to the link with the uplink destination 120 by transmitting valid OH bytes. In this aspect, the alarm-condition signal is sent in the payload section of a frame message. This aspect of the invention may also apply to OTN (G.709) and other derivatives of such communication formats.

The uplink destination may communicate with the downlink source in response to receiving the alarm-condition signal (not shown), so that the downlink source 108 is aware that its transmissions are not being received. Additional information may be received in OH communications to the uplink destination 120, and relayed to the downlink source 108, to permit additional analysis of the problem. In a full duplex system (see FIG. 2), the device 100 may enable communications from the uplink destination 120, via the Tx link, to the downlink source 108, as well as from the downlink source 108, via the Rx link, to the uplink destination 120.

In other aspects, the uplink destination 120 may be unable to communicate with the downlink source 108. Therefore, a downlink transmitter 130 may be used. The downlink transmitter 130 has an interface on line 114 for accepting the alarm-condition signal from the alarm detection module 112. The downlink transmitter has an interface on line 132 for transmitting the alarm-condition signal to the downlink source 108.

In a different aspect, the device 100 may act as a relay between a downstream device (e.g. downstream source 108) that originates an alarm-condition signal, and the destination (e.g., uplink destination 120). For example, the device 100 may simple relay a received alarm signal. Alternately, the receiver 104 accepts a first alarm-condition signal from the downlink source 108. For example, a pattern of all "0"s is received. To continue the example, the communication device 100 may recognize that uplink destination 120 is programmed to respond to a different kind of alarm-condition signal. In this case, the alarm detection module 112 converts the first alarm-condition signal to a second alarm-condition signal, which is transmitted by the uplink transmitter 116 to the uplink destination 120.

Figure 2:
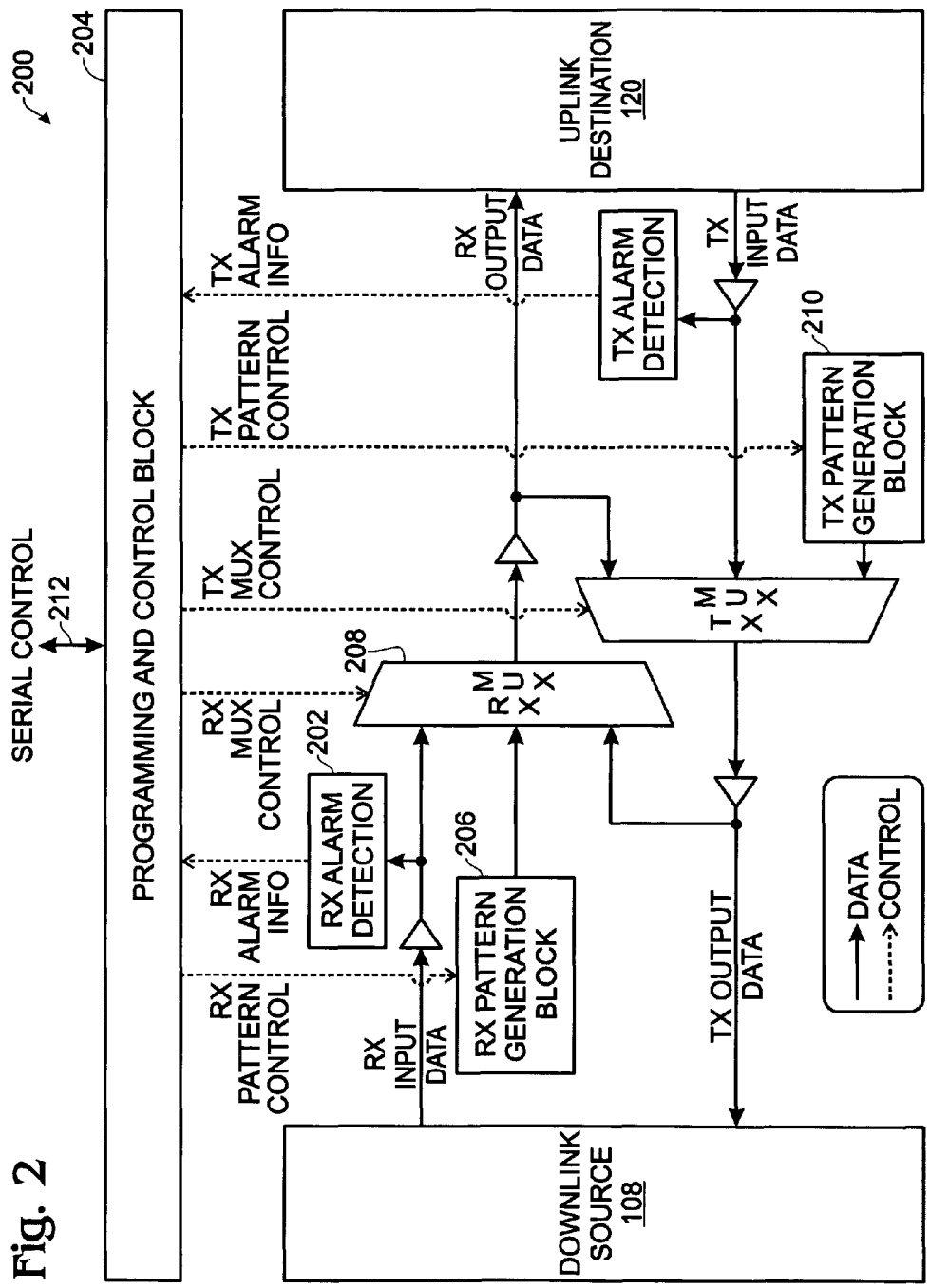
FIG. 2 is a schematic block diagram depicting a full duplex device enabled with a digital communications auto-squelch system.

FIG. 2 is a schematic block diagram depicting a full duplex device enabled with a digital communications auto-squelch system. The device 200 is full duplex in that it can communicate in both Rx (uplink) and Tx (downlink) directions. The alarm detection module function described in FIG. 1 is here performed with an Rx alarm detection circuit 202 to read incoming signals, and a programming and control block 204 to process the receive signals and determine if an alarm condition exists. Further, an Rx pattern generation block 206 generates the alarm-condition signal in response to commands from the programming block 204. An Rx MUX 208 passes the received signal or the alarm-condition signal in response to commands from the programming block 204. Duplicate functionality exists in the Tx link. Further, the Rx MUX 208 can be used to wrap-around a Tx link signal into the Rx link. For example, the wrap-around signal can be an alarm-condition signal generated by Tx pattern generation block 210. That is, the user can configure any alarm-condition signal to run from any device input, to any device output.

In some aspects, control over thresholds, alarm-condition signals, and the transmission of manual alarm-condition signals may be enabled from register bit or external I/O programming as represented by serial control line 212.

Functional Description

FIG. 3 is a flowchart depicting a method for auto-squelching digital communications in a communications device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 300.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Step 302 receives digital information from a source node, in either a serial or parallel data streams. Step 304 detects an alarm condition associated with the received digital information. Step 306 transmits an alarm-condition signal to a destination node. In one aspect, the alarm-condition signal is transmitted automatically in response to detecting the alarm condition. In another aspect, a user may manually transmit an alarm-condition signal. Note, in the manual alarm mode, the alarm-condition signal may be sent regardless of input signal quality, and even if an alarm condition is not detected. Step 308 maintains a valid link to the destination node in response to transmitting the alarm-condition signal. The transmitted alarm-condition signal may be either a serial or parallel data streams, depending on the communication formats used. Even if Step 302 fails to recover the received digital information, Step 308 maintains the link to the destination node, regardless of failing to recover the received digital information. Alternately stated, Step 308 maintains the link by communicating alarm condition information, even if it is unable to communicate intended information, where the intended information may be understood to be a traffic channel, payload, or data sent by the source node.

In one aspect, receiving digital information includes the substeps of, Step 302a, receiving a serial stream of digital information, and Step 302b, recovering a clock signal from the serial data stream. Then, detecting the alarm condition in Step 304 includes substeps. Step 304a compares a frequency associated with the recovered clock signal, with a reference frequency. Step 304b detects a variance between the recovered clock signal frequency and the reference frequency. In other aspects, Step 304 detects an alarm condition such as loss of signal, loss of lock, out of band, run length, loss of light, loss of frame, low receiver power, a large BER, signal fail, signal degrade, link failure, receive signal strength, remote error indicator, bit interleaved parity, 8 B/10 B coding errors, or running disparity errors. The above-mentioned alarm conditions are a small list of exemplary conditions that may be used to trigger an alarm. The method is not necessarily limited to operate with just these alarm conditions.

In one aspect, transmitting the alarm-condition signal in Step 306 includes transmitting a serial or parallel data stream of information such as all "0"s data, all "1"s data, alternating "0"s and "1"s data, a predetermined pattern of "0"s data and "1"s data, or a pseudorandom pattern of "0"s and "1"s data. Again, this is an exemplary list. The method is not limited to any particular alarm-conditions signal type.

In one aspect Step 301a selects an alarm-condition signal (e.g., all "0"s data). In another aspect, Step 301b selects a received digital information quality threshold. Then, detecting the alarm condition in Step 304 includes comparing the received digital information to the selected quality threshold. Further, Step 301b may select a plurality of quality thresholds, and Step 304 compares the received digital information to the plurality of selected quality thresholds. These steps enable the method to transmit a unique alarm-condition signal for each quality threshold (Step 306).

In one scenario, the intended transmitted signal is data—a traffic channel with no overhead, and the alarm-condition signal transmitted in Step 306 simply replaces the traffic channel. Some communication links include both traffic and overhead channels. In one aspect, the alarm-condition signal replaces both the traffic and overhead channels. In another aspect, the normal overhead channels are maintained or regenerated, but the traffic channels are replaced with the alarm-condition signal. For example, transmitting the alarm-condition signal in Step 306 may include transmitting information in a format that includes payload and overhead (OH) bytes. Step 308 maintains the valid link to the destination node by transmitting valid OH bytes to the destination node.

In one aspect, receiving the digital information in Step 302 includes receiving a first alarm-condition signal from the source node, which is interpreted as an alarm condition in Step 304. Then, Step 305 converts the first alarm-condition signal to a second alarm-condition signal in response to detecting the alarm condition. Step 306 transmits the second alarm-condition signal to the destination node. The method may convert an alarm-condition signal to pass between systems with different communication protocols. For example, idles from a Fibre channel may be encoded per a protocol specification such as 8 B/10 B, and transmitted to maintain a link between systems with different protocols.

In another aspect of the method, Step 309 transmits an alarm-condition signal to the source node in response to detecting an alarm condition associated with the received digital information.

A system and method have been providing that permit a communications device to auto-squelch digital communications. Some examples of alarm conditions, communications formats, and alarm-condition signals have been given to illustrate the invention. However, the invention is not limited to merely these examples. Other variations and embodiments of the invention will occur to those skilled in the art.

We claim:

1. In a communications device, a method for auto-squelching digital communications, the method comprising:
   receiving digital information from a source node as follows:
      receiving a serial stream of digital information;
      recovering a clock signal from the serial data stream;
   detecting an alarm condition associated with the received digital information as follows:
      comparing a frequency associated with the recovered clock signal with a reference frequency:
      detecting a variance between the recovered clock signal frequency and the reference frequency;
   transmitting an alarm-condition signal to a destination node; and,
   in response to transmitting the alarm-condition signal, maintaining a valid link to the destination node.

2. The method of claim 1 wherein detecting the alarm condition includes detecting an alarm condition selected from a group consisting of loss of signal, loss of lock, out of band, run length, loss of light, loss of frame, low receiver power, a large BER, signal fail, signal degrade, link failure, receive signal strength, remote error indicator, bit interleaved parity, 8B/10B coding errors, and running disparity errors.

3. The method of claim 1 wherein receiving the digital information includes receiving digital information selected from a group consisting of a serial data stream and a parallel data stream; and,
   wherein transmitting the alarm-condition signal includes transmitting a signal selected from a group consisting of a serial data stream and a parallel data stream.

4. The method of claim 1 wherein transmitting the alarm-condition signal includes transmitting a serial data stream of information selected from a group consisting of all "0"s data, all "1"s data, alternating "0"s and "1"s data, a predetermined pattern of "0"s data and "1"s data, and a pseudorandom pattern of "0"s and "1"s data.

5. The method of claim 1 wherein receiving digital information from the source node includes failing to recover the received digital information; and,
   wherein maintaining the valid link to the destination node includes maintaining the link to the destination node, regardless of failing to recover the received digital information.

6. The method of claim 1 further comprising:
   selecting an alarm-condition signal.

7. The method of claim 1 further comprising:
   selecting a received digital information quality threshold; and,
   wherein detecting the alarm condition includes comparing the received digital information to the selected quality threshold.

8. The method of claim 7 wherein selecting the received digital information quality threshold includes selecting a plurality of quality thresholds;
   wherein detecting the alarm condition includes comparing the received digital information to the plurality of selected quality thresholds; and,
   wherein transmitting the alarm-condition signal includes transmitting a unique alarm-condition signal for each quality threshold.

9. The method of claim 1 wherein transmitting the alarm-condition signal includes transmitting information in a format that includes payload and overhead (OH) bytes; and,
   wherein maintaining the valid link to the destination node includes transmitting valid OH bytes to the destination node.

10. The method of claim 1 wherein receiving the digital information includes receiving a first alarm-condition signal from the source node;
   the method further comprising:
   in response to detecting the alarm condition, converting the first alarm-condition signal to a second alarm-condition signal; and,
   wherein transmitting the alarm-condition signal includes transmitting the second alarm-condition signal to the destination node.

11. The method of claim 1 further comprising:
   in response to detecting an alarm condition associated with the received digital information, transmitting an alarm-condition signal to the source node.

12. In a communications device, a system for auto-squelching digital communications, the system comprising:
   an uplink receiver having an interface for receiving digital information from a downlink source and an interface for supplying the digital information;
   an alarm detection module having an interface for receiving the digital information, detecting an alarm condition associated with the digital information, and supplying an alarm-condition signal at an interface; and,
   an uplink transmitter having an interface for accepting the alarm-condition signal and an interface that maintains a valid link to an uplink destination in response to transmitting the alarm-condition signal, the uplink transmitter transmitting information in a format that includes payload and overhead (OH) bytes, and maintaining a valid link to the destination node by transmitting valid OH bytes.

13. The system of claim 12 wherein the receiver accepts a serial stream of digital information and recovers a clock signal from the serial data stream;
   wherein the alarm detection module detects an alarm condition in response to comparing a frequency associated with the recovered clock signal, with a reference frequency, and detecting a variance between the recovered clock signal frequency and the reference frequency.

14. The system of claim 12 wherein the alarm detection module detects an alarm condition selected from a group consisting of loss of signal, loss of lock, out of band, run length, loss of light, loss of frame, low receiver power, a large BER, signal fail, signal degrade, link failure, receive signal strength, remote error indicator, bit interleaved parity, 8B/10B coding errors, and running disparity errors.

15. The system of claim 12 wherein the uplink receiver accepts digital information selected from a group consisting of a serial data stream and a parallel data stream; and, wherein the uplink transmitter transmits an alarm-condition signal selected from a group consisting of a serial data stream and a parallel data stream.

16. The system of claim 12 wherein uplink transmitter transmits the alarm-condition signal as a signal selected from a group consisting of all "0"s data, all "1"s data, alternating "0"s and "1"s data, a predetermined pattern of "0"s data, and "1"s data, and a pseudorandom pattern of "0"s and "1"s data.

17. The system of claim 12 wherein the uplink receiver fails to recover the received digital information; and,
wherein the uplink transmitter maintains a valid link to the uplink destination, regardless of whether the uplink receiver recovers the received digital information.

18. The system of claim 12 wherein the alarm detection module has an interface for selecting an alarm-condition signal.

19. The system of claim 12 wherein the alarm detection module has an interface for selecting a received digital information quality threshold, the alarm detection module detecting the alarm condition by comparing the received digital information to the selected quality threshold.

20. The system of claim 19 wherein the alarm detection module has an interface for selecting a plurality of quality thresholds, the alarm detection module detecting the alarm condition by comparing the received digital information to the plurality of selected quality thresholds; and,
wherein the uplink transmitter transmits a unique alarm-condition signal for each quality threshold.

21. The system of claim 12 wherein the uplink receiver accepts a first alarm-condition signal from the downlink source;
wherein the alarm detection module converts the first alarm-condition signal to a second alarm-condition signal; and,
wherein the transmitter transmits the second alarm-condition signal to the uplink destination.

22. The system of claim 12 further comprising:
a downlink transmitter having an interface for accepting the alarm-condition signal from the alarm detection module, and an interface for transmitting the alarm-condition signal to the downlink source.

23. In a communications device, a system for auto-squelching digital communications, the system comprising:
an uplink receiver having an interface for receiving digital information from a downlink source and an interface for supplying the digital information;
an alarm detection module having an interface for receiving the digital information, detecting an alarm condition associated with the digital information, and supplying an alarm-condition signal at an interface;
an uplink transmitter having an interface for accepting the alarm-condition signal and an interface that maintains a valid link to an uplink destination in response to transmitting the alarm-condition signal
wherein the uplink receiver accepts a first alarm-condition signal from the downlink source;
wherein the alarm detection module converts the first alarm-condition signal to a second alarm-condition signal; and,
wherein the uplink transmitter transmits the second alarm-condition signal to the uplink destination.

* * * * *